(12) United States Patent
Scharfenberg et al.

(10) Patent No.: US 11,549,215 B2
(45) Date of Patent: Jan. 10, 2023

(54) METHOD AND DEVICE FOR THE TREATMENT OF A PRODUCT WEB

(71) Applicant: ANDRITZ KUESTERS GMBH, Krefeld (DE)

(72) Inventors: Manfred Scharfenberg, Krefeld (DE); Franz-Josef Kohnen, Toenisvorst (DE); Andreas Lukas, Sonsbeck (DE); Andre Huennekens, Straelen (DE)

(73) Assignee: ANDRITZ KUESTERS GMBH, Krefeld (DE)

( * ) Notice: Subject to any disclaimer, the term of this patent is extended or adjusted under 35 U.S.C. 154(b) by 343 days.

(21) Appl. No.: 16/499,874

(22) PCT Filed: Mar. 19, 2018

(86) PCT No.: PCT/EP2018/056794
§ 371 (c)(1),
(2) Date: Oct. 1, 2019

(87) PCT Pub. No.: WO2018/184819
PCT Pub. Date: Oct. 11, 2018

(65) Prior Publication Data
US 2020/0109514 A1    Apr. 9, 2020

(30) Foreign Application Priority Data
Apr. 3, 2017    (DE) .................. 10 2017 107 120.2

(51) Int. Cl.
*D21G 1/02* (2006.01)
*D21F 7/08* (2006.01)
(Continued)

(52) U.S. Cl.
CPC .......... *D21G 1/0293* (2013.01); *B29C 59/04* (2013.01); *D21F 7/08* (2013.01); *D21G 1/002* (2013.01)

(58) Field of Classification Search
CPC . B29C 59/04; D21G 1/00; D21G 1/02; D21G 1/0293; D06C 15/02
See application file for complete search history.

(56) References Cited

U.S. PATENT DOCUMENTS 3,244,090 A    4/1966  Bischoff
4,915,026 A *  4/1990  Halme .................. D21G 1/00
                                                  100/161
(Continued)

FOREIGN PATENT DOCUMENTS

DE    32 16 182 A1    11/1983
DE    3216182 A1 *    11/1983    ........... D21G 1/0293
(Continued)

OTHER PUBLICATIONS

English translation of DE-3216182-A1 by EPO. (Year: 1983).*
English translation of DE-102015106045-B3 by EPO. (Year: 2016).*
English translation of WO-2016046030-A2 by EPO. (Year: 2016).*

*Primary Examiner* — Niki Bakhtiari
*Assistant Examiner* — Inja Song
(74) *Attorney, Agent, or Firm* — Norman B. Thot

(57) ABSTRACT

A method for a treatment of a product web which is transported in an advance direction includes guiding the product web through a treatment gap which is formed by a first treatment roll being arranged in a first working position and a contour tool, providing a second roll, moving the second roll into a second working position in which the second roll forms a second treatment gap with the counter tool, and moving the first treatment roll into a first parked position in which the first treatment roll does not form a treatment gap with the counter tool.

12 Claims, 6 Drawing Sheets

(51) Int. Cl.
    *B29C 59/04* (2006.01)
    *D21G 1/00* (2006.01)

(56) References Cited

U.S. PATENT DOCUMENTS 5,131,324 A * 7/1992 Lassila .................. D21G 1/002
                                                100/163 R
2001/0011408 A1  8/2001 Exner

FOREIGN PATENT DOCUMENTS

| DE | 40 35 986 A1 | 5/1991 | |
|----|----|----|----|
| DE | 100 05 306 | 6/2001 | |
| DE | 10 2014 102 167 A1 | 9/2015 | |
| DE | 10 2014 113 755 A1 | 3/2016 | |
| DE | 10 2015 106 045 B3 | 8/2016 | |
| DE | 10 2015 107 839 B3 | 8/2016 | |
| DE | 102015106045 B3 * | 8/2016 | ............. D06C 15/02 |
| WO | WO 2016/046030 A2 | 3/2016 | |
| WO | WO-2016046030 A2 * | 3/2016 | ............. D06C 15/02 |

* cited by examiner

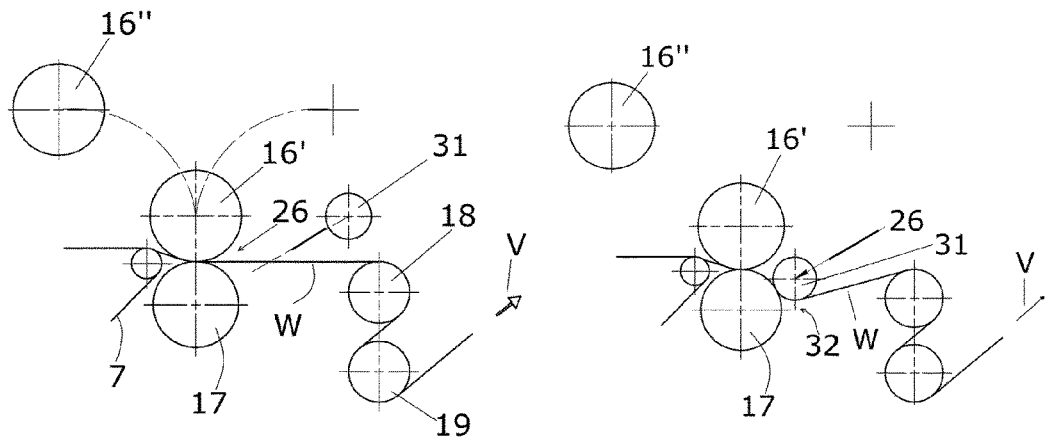
Fig. 17     Fig. 18
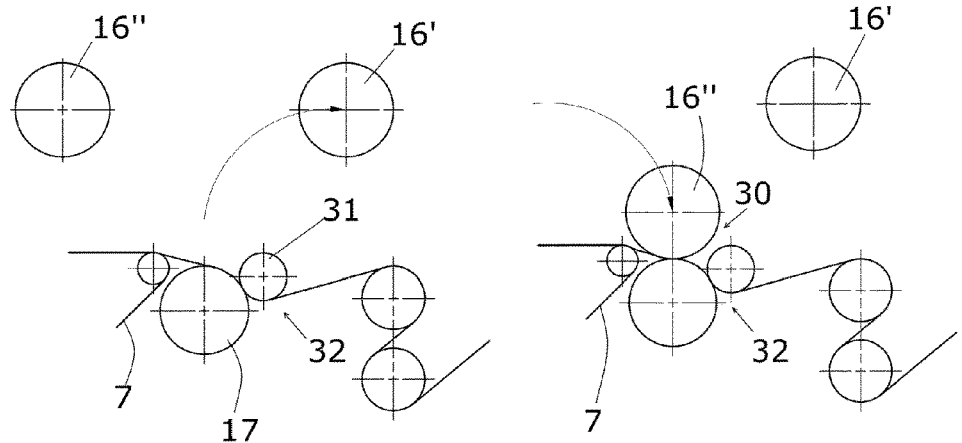
Fig. 19     Fig. 20
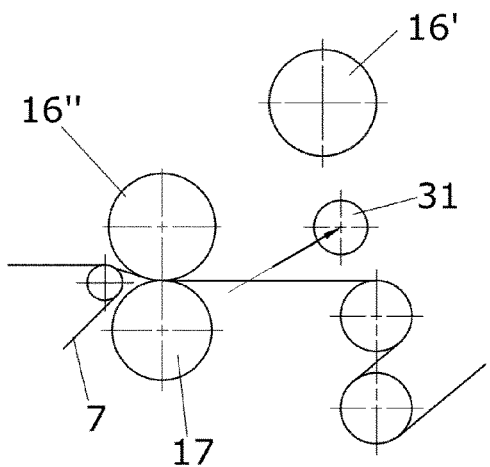
Fig. 21

METHOD AND DEVICE FOR THE TREATMENT OF A PRODUCT WEB

CROSS REFERENCE TO PRIOR APPLICATIONS

This application is a U.S. National Phase application under 35 U.S.C. § 371 of International Application No. PCT/EP2018/056794, filed on Mar. 19, 2018 and which claims benefit to German Patent Application No. 10 2017 107 120.2, filed on Apr. 3, 2017. The International Application was published in German on Oct. 11, 2018 as WO 2018/184819 A1 under PCT Article 21(2).

FIELD

The present invention relates to a method for the treatment of a product web, in which the product web is transported in an advance direction and is guided through a first treatment gap formed by a treatment roll located in a first working position and a counter tool. The present invention also relates to a device for carrying out the treatment method.

BACKGROUND

For treatment of a product web, it is known to transport the product web in an advance direction and to guide the product web through a first treatment gap formed by a treatment roll located in a first working position and a counter tool. Product webs of this type may in particular be those made of non-woven fabric, textile, plastics material or paper, as well as composite materials comprising one or more of these materials.

In a treatment of this type, there is regularly a need to replace the treatment rolls. Examples of reasons therefor include:

The wear limit of the treatment roll being reached.
Changing the treatment result by replacing the treatment roll with one having a changed surface structure and/or surface property, for example, changed engraving, cover material, cover hardness, etc.

Replacement of the treatment roll may also be due to a desire to change the surface temperature of the treatment roll, which has a decisive influence on the treatment result. A temperature change of this type can regularly be brought about more quickly by changing the replacement roll for a further roll of this type kept at the desired temperature, since a temperature change in the surface of a roll is often only possible at 1 to 3 K/min to avoid thermal tensions in the roll material.

An example treatment of a product web is thermal solidifying of a product web that comprises non-woven material having thermoplastic fibers or filaments. During the thermal solidifying of non-woven materials using a treatment gap, the treatment roll is regularly formed as an engraved roll. The counter tool is regularly a smooth roll. Depending on requirements stemming from the desired treatment result, however, the roll forming the counter tool may also be an engraved roll. At least one of the two rolls, for example, the treatment roll, is heated. The surface temperature of the heated roll is usually between 80° C. and 300° C., for example, between 120° C. and 250° C., for example, between 140° C. and 200° C. In thermal bonding methods, the line load in the treatment gap is usually 10-300 N/mm, for example, 30-150 N/mm. At least the treatment roll must be replaceable to be able to produce different products.

In the treatment of paper or textiles, the treatment gap is often formed by a treatment roll having a resilient cover and a counter tool, which may in particular be formed as a heated smooth or engraved roll. In a treatment of this type, there is also a need to be able to replace the treatment roll, for example, to be able to use a different cover type or cover hardness or to be able to replace the treatment roll for an unworn roll when the wear limit thereof is reached. The covers of these treatment rolls may, for example, be plastics material covers or else ones that contain cotton material.

There has long been a desire to be able to perform a rapid change of a treatment roll. The calender known from DE 100 05 306 C1, for example, is suitable for this purpose. It comprises two treatment rolls, which are each mounted about a dedicated lever and which can alternately be displaced from an associated parked position into a working position in which the treatment roll in question forms the treatment gap with a counter tool, in this case, a counter roll. By pivoting out a first treatment roll from the working position into the parked position thereof and subsequently pivoting in the second treatment roll from the parked position thereof into the working position, it is possible in principle to change the treatment rolls in an extremely short time.

In spite of this mechanically provided option for a rapid treatment roll change, the change is not always possible in practice due to method conditions. One example is a production method for non-woven materials that comprises the method step of thermal solidifying.

In this method, calenders for thermal solidifying of the non-woven material are often arranged downstream of a spinning machine in the advance direction of the product web. In this spinning machine, one or more spinning beams lay fibers or filaments (hereinafter referred to collectively as "filaments") of a thermoplastic material is laid down on the upper face of a circulating filter belt (also hereinafter referred to as the "spinning process" for short), which circulating filter belt is deflected close to the treatment gap and which transports the filament layer (also known as unsolidified non-woven or unsolidified product web) to the treatment gap. An extruder, via which a granulate of thermoplastic plastics material is heated to a melt, the melt being supplied under pressure to spinning nozzles provided in the spinning beam, may be associated with each spinning beam. The filaments exiting the spinning nozzles are stretched by an airstream that strikes the upper face of the filter belt, cooled, and deposited on the filter belt. The airstream can be sucked through the filter belt.

Upon passing through the treatment gap, the previously unsolidified non-woven undergoes solidification as a result of the temperature and line pressure prevailing in the treatment gap, making it possible to supply the product web to further treatment stations, such as cooling, application, drying or winding means, as well as pulling units or inspection systems for quality control.

Although devices that make rapid replacement of a treatment roll possible are have previously been described, such as the calender described in DE 100 05 306 C1, in the described method for thermal solidification, because of the tear sensitivity of the still unsolidified non-woven web, the transport of the product web in the advance direction is regularly interrupted for the duration of the roll change; i.e., no product web is guided through the calender and the further system components during the roll change. The circulating filter belt is stopped for this purpose. To avoid filaments being deposited on the filter belt by the one or more spinning beams accumulating in the meantime, the deposition of the filaments must also be interrupted; i.e., the spinning beams must be shut down.

The shutdown is highly disadvantageous since the product web must initially be guided off again at a transport speed of less than 50 m/min. To achieve the product web stability required for this guiding off, a prepared precursor is initially laid on the filter belt and guided through the system, with the spinning process subsequently being restarted on the precursor. The transport speed is then again increased, usually to 100 m/min to 1,000 m/min or even higher. After a restart, a not insignificant time is initially required until the treatment parameters required for the desired treatment result have been established, such as the temperature of the spinning beams, the viscosity of the thermoplastic, the surface weight dependent thereon of the unsolidified product web, etc. Production efficiency is sensitive to disruption due to a roll change, not only from the interruption of the treatment method during the roll change, but also from the production of a not insignificant amount of waste after the treatment method is restarted.

As an alternative to the above-described procedures, for a roll change the filaments from the spinning beams can be deposited on an already solidified product web, which is deposited upstream of the spinning beam and deposited on the filter belt. The deposited filaments are otherwise combined into two already solidified product webs in that another additional one is deposited on the layer of filaments downstream of the spinning beam. Supplying these additional product web(s) is started before the roll change and only stopped thereafter.

To make manual handling of the solidified layer(s) possible in this case, the transport speed must also initially be reduced to, for example, less than 50 to 100 m/min. To minimize the amount of waste produced during the roll change and, in particular in systems having a high overall throughput, to keep the surface weight of the unsolidified top layer or intermediate layer low enough that it can actually be guided through the system using the solidified layer(s), the throughput of the individual spinning beams can/should be reduced. However, this is attempted to be avoided since this change can lead to a disruption of the method parameters in the spinning beam. The thermal equilibrium must in this case also first be reestablished after the roll change. The outlay to be provided by the system operators is also high, and (as a result of the solidified layers) much more material must be disposed of or recycled.

If product webs, for example, of textile, plastics material or paper, are being treated, a roll change always leads to an interruption of the treatment method and thus reduces the method productivity.

SUMMARY

An aspect of the present invention is to provide a method that improves the productivity for the treatment of a product web compared to known methods, as well as a device suitable for carrying out the method.

In an embodiment, the present invention provides a method for a treatment of a product web which is transported in an advance direction, which includes guiding the product web through a treatment gap which is formed by a first treatment roll being arranged in a first working position and a contour tool, providing a second roll, moving the second roll into a second working position in which the second roll forms a second treatment gap with the counter tool, and moving the first treatment roll into a first parked position in which the first treatment roll does not form a treatment gap with the counter tool.

BRIEF DESCRIPTION OF THE DRAWINGS

The present invention is described in greater detail below on the basis of embodiments and of the drawings in which:

FIG. 17 shows the product web again provided by a filter belt and being guided through a treatment gap and subsequently circulating around two cooling rolls;

FIG. 18 shows (in contrast to FIGS. 4 to 9) an auxiliary roll being brought into contact with the counter roll while the treatment gap still persists, thereby creating a sort of auxiliary treatment gap between the auxiliary roll and the counter tool;

FIG. 19 shows the operating state after the treatment gap is opened;

FIG. 20 shows that, instead of the first treatment roll, a second treatment roll is displaced into a working position to form a new treatment gap; and FIG. 21 shows that once the position in FIG. 20 is achieved, that the auxiliary roll is moved away.

DETAILED DESCRIPTION

Figure 1:
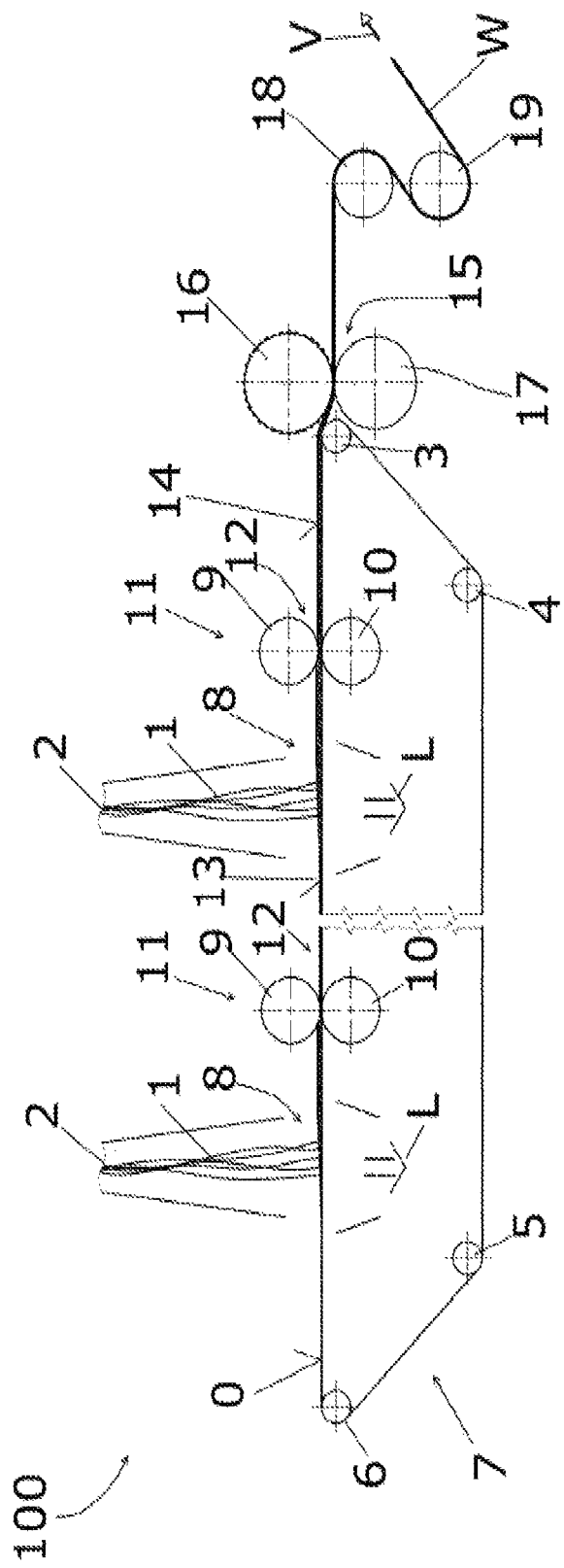
FIG. 1 shows a prior art treatment method for thermal solidification of layers, laid on a filter belt, of filaments comprising thermoplastic material into a non-woven material.

In the method according to the present invention, to replace a treatment roll used in carrying out the method, also referred to hereinafter as the "first treatment roll", the following steps are carried out:

A second roll is provided, for example, in a parked position, while the first treatment roll is located in the first working position thereof and while the product web is transported in the advance direction and through the roll gap formed between the first treatment roll and the counter tool.

The second roll is displaced into a second working position, in which it forms a second processing gap together with the counter tool, i.e., while the first roll also forms a first processing gap together with the counter tool. In other words, the method according to the present invention provides that the product web passes through two roll gaps during this method step, i.e., one formed between the first treatment roll and the counter tool and one formed between the second roll and the counter tool. The line loads in the two roll gaps can, for example, be reduced, for example, to 100 N/mm or even lower, for example, to 50 N/mm. It is thereby important that it is entirely within the scope of the method step for the first treatment roll to be displaced relative to the counter tool, as long as a processing gap formed together with the counter tool is maintained. Although also desirable, it is not required for the treatment parameters prevailing in the first processing gap, such as line load, line load distribution, temperature, etc., to remain unchanged during this method step, as long an interruption to the method, for example, due to tearing or due to formation of a roll winding as a result of the product web adhering to a roll, is prevented.

While the second roll forms a second processing gap together with the counter tool, in the method according to the present invention, the first treatment roll is displaced into a first parked position in which it does not form a processing gap with the counter tool.

In an embodiment of the method according to the present invention, a second treatment roll is used for the second roll. A "second treatment roll" means a roll via which the treatment of the product web is continued without interruption, and in particular without the parameters with which the spinning beams are operated necessarily having to be changed—whether with the aim of maintaining an unchanged treatment result or of modifying the treatment result in a targeted manner, for example, by substituting a second treatment roll with engraving and/or temperature changed from the first. The method step of continuing the treatment method using the second treatment roll also comprises the second roll being displaced, while maintaining the formation of a second treatment gap, at least approximately into the position corresponding to the working position of the first treatment roll, after the latter has been displaced into the parked position thereof. In this context, the working positions may deviate at least far enough from one another that they would not be possible with both upper rolls simultaneously because the rolls or the mountings thereof would then collide.

In an embodiment of the method according to the present invention, the second roll is an auxiliary roll. The term "auxiliary roll" means a roll with which a continuation of the treatment method is not possible while maintaining the other method parameters such as transport speed, line load in the treatment gap, temperature of the treatment roll, but under the effect of the auxiliary roll on the product web, solidification thereof is brought about that makes further transport possible, if required at a reduced speed while avoiding tearing or other events that interrupt the treatment method. The treatment of the product web using the auxiliary roll in this case can, for example, be continued until the first treatment roll is displaced into the parked position thereof and has been replaced with a replacement treatment roll into a second working position. The first and second working positions may deviate at least far enough from one another that they would not be possible with both upper rolls simultaneously because the rolls or the mountings thereof would then collide. The auxiliary roll is subsequently, for example, displaced into a second parked position, from which it can be brought into the second working position again for a fresh change in the first treatment roll.

The method according to the present invention is in particular suitable for the treatment of product webs that comprise non-woven fabric, textile, plastics material and/or paper.

The method according to the present invention is most particularly suitable for the thermal treatment of the product web, in particular for thermal solidification of a product web comprising non-woven fabric.

To carry out the method according to the present invention, any counter tools may in principle be used that are suitable for forming a treatment gap for the product web together with a treatment roll. The counter tool can, for example, be provided in the form of a counter roll, in particular as a controllable-deflection counter roll.

The device according to the present invention, which is suitable for carrying out the method according to the present invention, comprises a first treatment roll, which can be brought into a first working position to form a first processing gap together with a counter tool, and a second roll, which can simultaneously be brought into a second working position to form a second processing gap together with the counter tool, the first and second working position not corresponding.

The device according to the present invention can, for example, be formed so that the first treatment roll is displaceable between the first working position and a first parked position. It does not form a treatment gap together with the counter tool in the parked position, and can, for example, be manipulable in said position.

In an embodiment of the device according to the present invention, the second roll can, for example, be formed as a second treatment roll, which is distinguished by the features and properties described above. So as to be usable for forming a second treatment gap while the first treatment roll also forms a treatment gap together with the counter tool, the device can, for example, be formed so that the first treatment roll is displaceable into an intermediate position while maintaining the formation of a treatment gap. The device according to the present invention can, for example, be formed so that the second roll formed as a second treatment roll is also displaceable into a second intermediate position that forms a treatment gap together with the counter tool, from which position it can, for example, be displaceable, while maintaining the processing gap, into a second position, the location of which relative to the counter tool may approximately correspond to the relative position of the first treatment roll in the first working position. In this context, the working positions can deviate far enough from one another that they would not be possible with both upper rolls simultaneously because the rolls or the mountings thereof would then collide. The counter tool can, for example, be arranged displaceably in the vertical direction.

In an embodiment of the device according to the present invention, the second roll can, for example, be an auxiliary roll that can, for example, be displaceable into a position forming a treatment gap with the counter tool, while the first treatment roll is located in the first working position thereof. The auxiliary roll can, for example, remain in this position, while the first treatment roll can be displaced from the first working position into the first parked position and back. A second treatment roll is otherwise displaced into a second working position in which it forms a working gap together with the counter tool, it being possible for the second working position to correspond to the first working position. The working positions may in turn also deviate far enough from one another that they would not be possible with both upper rolls simultaneously because the rolls or the mountings thereof would then collide.

The present invention is described in greater detail below under reference to the drawings.

The device 100, shown purely schematically in FIG. 1 in a view transverse to the advance direction V of a product web W, is for solidifying a product web W comprising non-woven fabric. The product web W has filaments 1 of a thermoplastic material. To provide these filaments regularly at least one spinning beam 2 is provided. The device 100 shown in FIG. 1 comprises two spinning beams 2. Via these spinning beams 2, the respectively specified filaments 1 are deposited on an upper face O of a filter belt 7 or, if applicable, on a filament layer already located on the filter belt 7. The filter belt 7 is formed as an endless loop guided around deflection rolls 3, 4, 5, 6. For the purpose of a disruption-free deposition of the filaments, an airstream L that passes through the filter belt 7 from top to bottom is generated in the associated deposition region 8 of the associated spinning beam 2 using a suitable fan (which is not shown in the drawings).

Downstream of each deposition region 8 as viewed from the advance direction V, a pre-compaction roll pair 11 comprising two rolls 9, 10 is provided. The two rolls 9, 10 form between them a pre-compaction roll gap 12, which pre-compacts the filaments 1, which are deposited loose on the filter belt 7 previously in terms of the advance direction V, into a still unsolidified product web.

In the embodiment shown in FIG. 1 of the device 100, the second spinning beam in the advance direction V, shown on the right in FIG. 1, lays filaments 1 on a first, pre-compacted filament layer 13. This layer is pre-compacted into a two-layer filament layer 14 that is pre-solidified as a whole, using a further pre-compaction roll pair 11 downstream in the advance direction.

Lying on the surface O of the circulating filer belt 7, the two-layer filament layer 14 is handed over, in the region of the deflection roll 3 furthest upstream in the advance direction V, to a thermal bonding roll gap 15, which is formed between a treatment roll 16 and a counter tool 17. In the embodiment shown in the drawing of the device 100, the treatment roll 16 is formed by a heated, engraved roll and the counter tool 17 is formed by a smooth roll. It will be appreciated that, depending on the desired treatment result and depending on conditions specified by the filaments used, differently formed treatment rolls and counter tools may also be used. Merely by way of example, it is noted that an engraved roll, for example, heated in addition or alternatively to the treatment roll 16, may also be used as a counter tool. The treatment roll and/or the counter tool, if formed as a roll, may also be provided with or coupled to rotational drives.

The product web W is thermally solidified in the thermal bonding roll gap 15.

Downstream from the thermal bonding roll gap 15 in the advance direction V of the product web W, the product web W circulates around two cooling rolls 18, 19 so that each face of the product web W contacts a surface of one of the two cooling rolls 18, 19.

After passing the cooling rolls 18, 19, the product roll W is optionally, depending on the desired end product, subjected to further treatment steps, such as post-treatments, subsequent drying, and final winding. These further treatment steps are not shown in FIG. 1.

In practice, there is regularly a need to replace the treatment roll 16, for example, to replace the treatment roll 16 when a wear limit is reached with a treatment roll that is new in this regard, and/or so as to make a replacement with a differently configured and/or differently temperature-controlled treatment roll to change the treatment result.

For this type of replacement of a treatment roll 16, for example, the calender 200 is suitable, which is shown in FIGS. 2 and 3, again purely schematically, in a view transverse to the product web W.

Calender 200 comprises a frame 20, in which a first treatment roll 16', a second treatment roll 16" and a counter tool 17 formed as a counter roll 17' are arranged. In this context, the counter roll 17' is mounted on a slide 21, which can be displaced in the frame using a displacement device 22, for example, in the vertical direction as shown in FIGS. 2 and 3.

The first treatment roll 16' is mounted on a mounting, for example, a first pivot lever 23, which can be pivoted relative to the frame 20 via a pivot axle 24. The first pivot lever 23 has a pivot drive 25 therefor. The first pivot lever 23 is formed as a two-armed lever. The first treatment roll 16' is mounted on one side of the pivot axle 24. The pivot drive 25 acts on the other side of the pivot axle 24.

Figure 2:
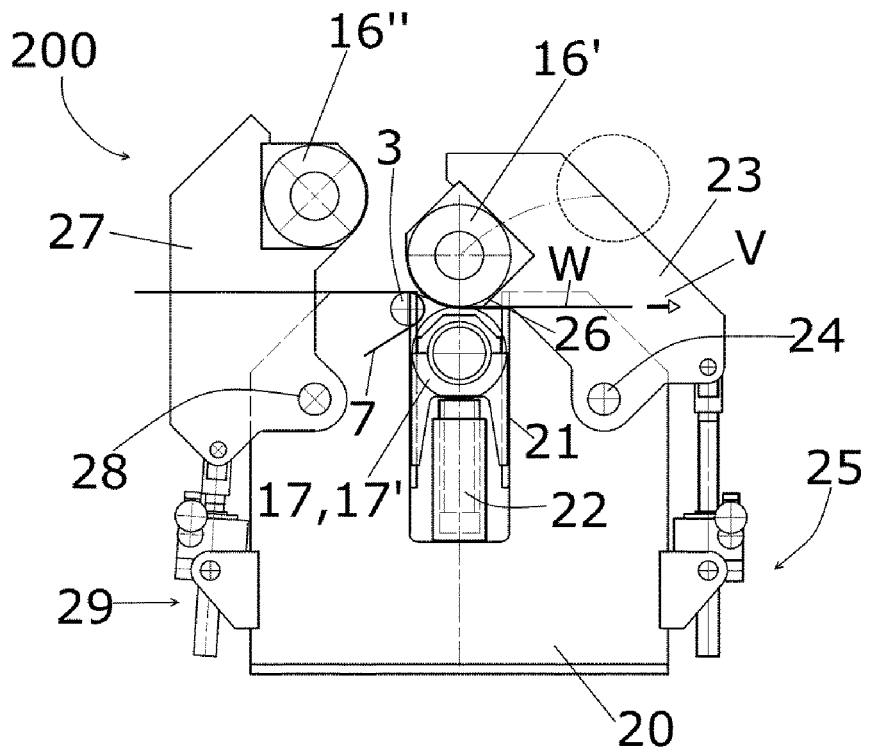
FIG. 2 show a calender suitable for carrying out a variant of the method according to the present invention.
Figure 3:
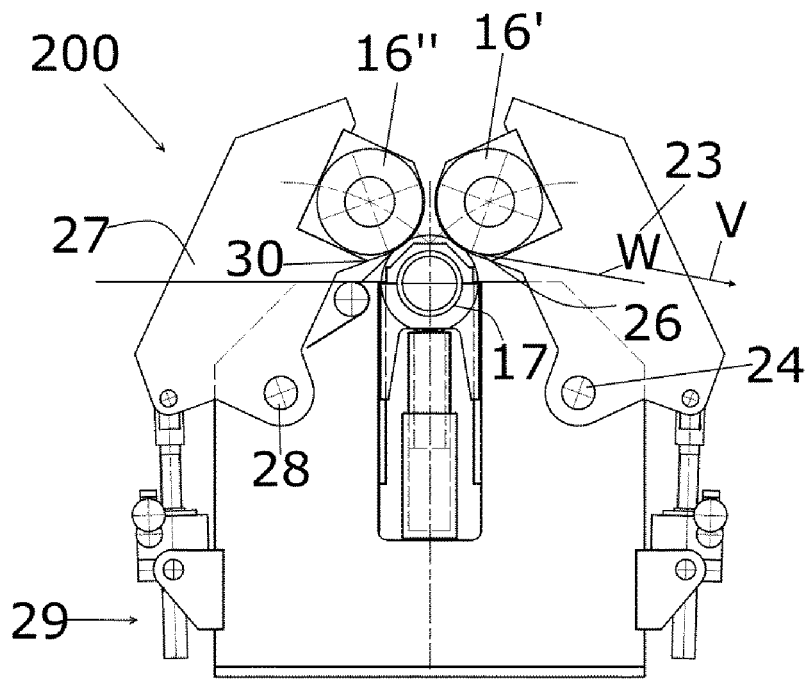
FIG. 3 shows a calender suitable for carrying out a variant of the method according to the present invention.

In the operating state shown in FIG. 2, the first treatment roll 16' is located in the working position thereof, in which, together with the counter tool 17, it forms a treatment gap 26 through which the product web W is guided in the advance direction V.

In a corresponding manner, the second treatment roll 16" is mounted on a mounting, for example, a second pivot lever 27, which is mounted on a frame 20 so as to be pivotable about a pivot axle 28 via a pivot drive 29. In the operating state shown in FIG. 2, the second treatment roll 16" is located in a parked position remote from the counter tool 17.

In a first embodiment of the calender, the pivot drives 25, 29 may be equipped with spindle lifting gears via which the position of the associated pivot lever 23, 27, and thus of the associated treatment roll 16', 16", is specified. The displacement device 22 may in this case in particular be formed as a hydraulically actuable lifting cylinder. The line load in the treatment gap can thus be influenced by varying the hydraulic pressure.

In a second embodiment of the calender, the pivot drives are provided with hydraulically actuable cylinders and the displacement device 22 is provided with a spindle lifting gear. Since the position of the counter roll is thus specified, the line load in the treatment gap can be influenced by varying the hydraulic pressure in the cylinder.

As can be seen in FIG. 3, the calender 200 is distinguished in that the working position, in which the first treatment roll 16' forms the first treatment gap 26 together with the counter tool 17, can be displaced into an intermediate position. For this purpose, in the embodiment shown in FIG. 3, it is provided to pivot the first pivot lever 23 about the pivot axle 24, with simultaneous displacement of the counter tool 17 vertically upward so that the treatment gap 26 is at least substantially maintained when the position thereof is assumed. "At least substantially maintained" means that, during the displacement into and in operating position shown in FIG. 3, the product web W undergoes a treatment that makes it possible to continue the transport in the advance direction V, whether at an unchanged or at a reduced advance speed.

As can also be seen in FIG. 3, in this case, the first treatment roll 16' and the counter tool 17 were displaced far enough that, by pivoting the second pivot lever 27 clockwise about the pivot axle 28 via the pivot drive 29, a second treatment gap 30 is formed between the second treatment roll 16" and the counter tool 17, and is passed through by the product web W. In the operating state shown in FIG. 3, two treatment gaps 26, 30 thus exist simultaneously, and the second treatment roll 16" is also located in an intermediate position. In order for the counter tool 17, which is counter roll 17' in the embodiment shown, to be displaceable into the position that makes simultaneous formation of two roll gaps possible, the displacement device 22 and the slide 21 are formed so that a larger stroke can be achieved with the counter tool than would be necessary for positioning at a stationary treatment roll.

In this context, the parameters of the second treatment gap 30, such as line load, line load distribution and temperature, are selected so that the transport of the product web in the advance direction V can be continued under the action of this second treatment gap 30, whether at an unchanged or at a reduced advance speed.

As is apparent from FIGS. 2 and 3, by further pivoting initially of the first pivot lever 23 clockwise, the treatment gap 26 can be opened. The first treatment roll 16' is thus located in the parked position shown dashed in FIG. 2. By subsequently pivoting the second pivot lever 27 clockwise while simultaneously lowering the counter tool 17, the second treatment roll 16" can be displaced, while at least substantially maintaining the treatment gap 30, into a working position that, in the embodiment shown in the drawings, approximately corresponds to the working position of the first treatment roll 16', shown in FIG. 2.

The method for the treatment of a product web that can be carried out using the calender 200 is further explained by FIGS. 4 to 9.

Figure 4:
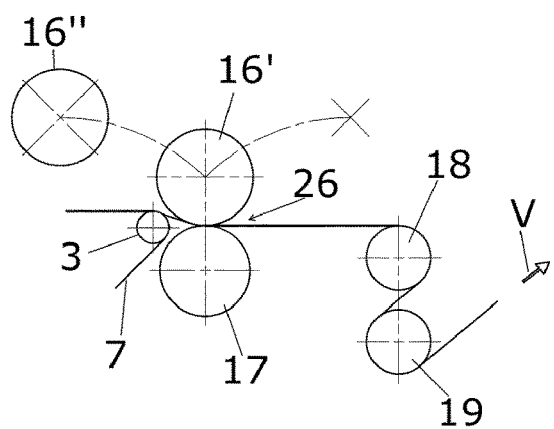
FIG. 4 shows an operating state in which the first treatment roll is in the working position, in which it forms, together with the counter tool formed as a counter roll, the treatment gap through which the product web supplied in the advance direction by the filter belt is transported.

FIG. 4 shows an operating state in which the first treatment roll 16' is in the working position thereof, in which it forms, together with the counter tool 17 formed as a counter roll, the treatment gap 26 through which the product web W supplied in the advance direction V by the filter belt 7 is transported.

Figure 5:
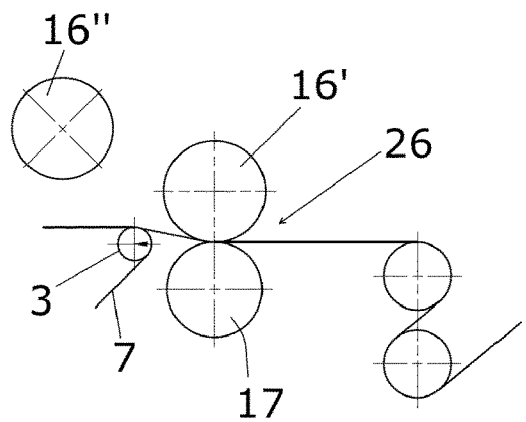
FIG. 5 shows that a free space is initially created by displacing the filter belt onwards from the treatment gap to provide a replacement of the first treatment roll, thereby making it possible to displace the counter tool upward if the first treatment roll is simultaneously pivoted to the right into an intermediate position.
Figure 6:
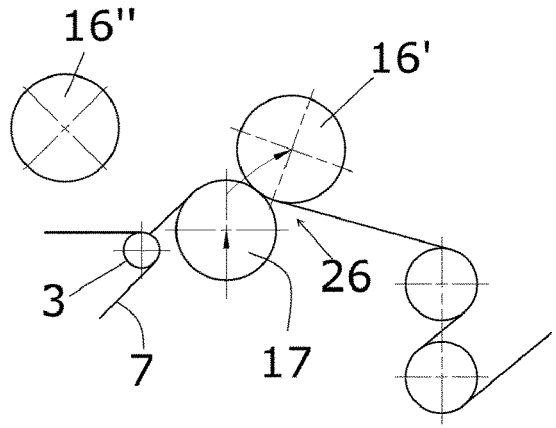
FIG. 6 shows the operating state resulting from FIG. 5, where the second treatment roll is also displaced toward the counter tool into a second working position.
Figure 7:
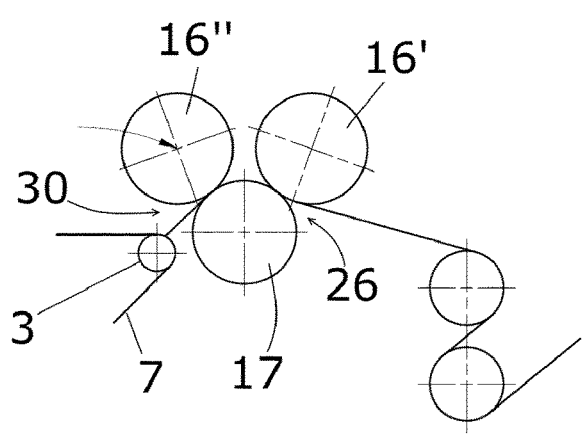
FIG. 7 shows the forming of a treatment gap together with the counter roll.

To provide replacement of the first treatment roll 16', a free space is initially created by displacing the filter belt 7 onwards from the treatment gap 26, to the left in the embodiment shown in FIG. 5, which makes it possible to displace the counter tool 17 upward if the first treatment roll 16' of FIG. 5 is simultaneously pivoted to the right into an intermediate position. The resulting operating state is shown in FIG. 6. In this operating state, the second treatment roll 16" is also displaced toward the counter tool 17 (into a second working position) in which it also, as shown in FIG. 7, forms a treatment gap 30 together with the counter roll 17.

Figure 8:
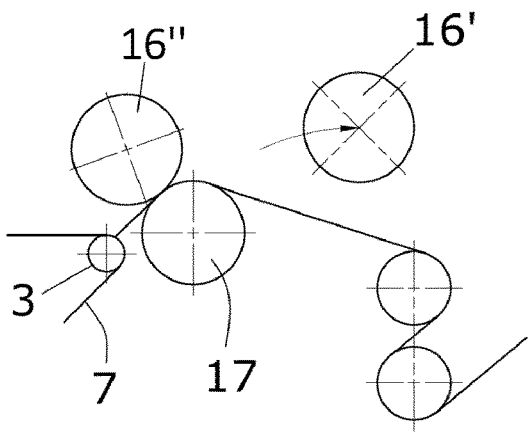
FIG. 8 shows that the first treatment roll moved away from the counter tool, thereby opening the treatment gap, and displaced, for example, into a parked position.
Figure 9:
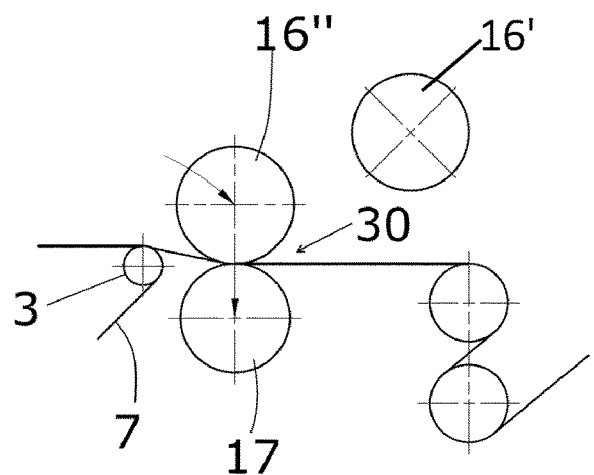
FIG. 9 shows that, while the treatment gap is maintained, the counter tool is lowered until the second treatment roll has reached the working position originally taken up by the first treatment roll and the counter tool has reached the starting position thereof shown in FIG. 4.
Figure 10:
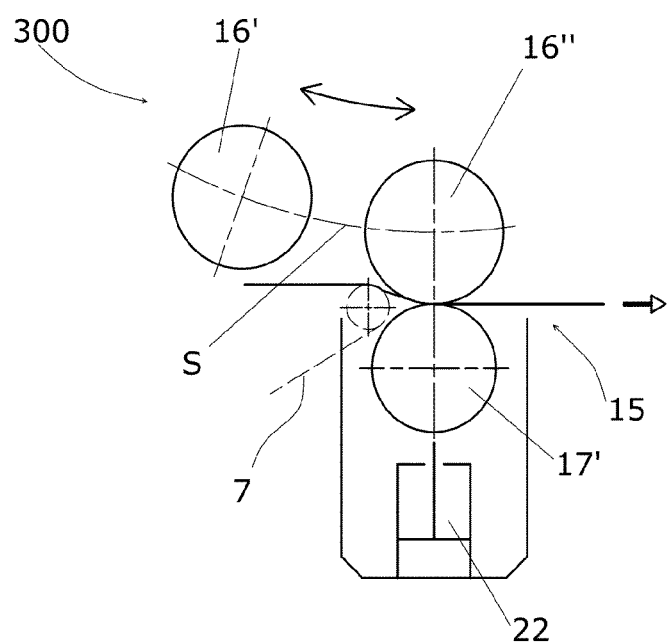
FIG. 10 shows an operating position where the second treatment roll forms the thermal bonding roll gap together with the counter tool formed as a counter roll, in other words is located in the working position thereof.

Subsequently, as shown in FIG. 8, the first treatment roll 16' is moved away from the counter tool 17, opening the treatment gap 26, and displaced, for example, into a parked position. Subsequently, as shown in FIG. 9, while maintaining the treatment gap 30, the counter tool 17 is lowered until the second treatment roll 16" has reached the working position originally taken up by the first treatment roll 16' and the counter tool 17 has reached the starting position thereof shown in FIG. 4. Subsequently, to continue the treatment method, the filter belt 7 is displaced back into the starting position thereof shown in FIG. 4.

Throughout this roll change process, the transport of the product web W in the advance direction V is continued, whether at an unchanged or at a reduced advance speed.

Figure 11:
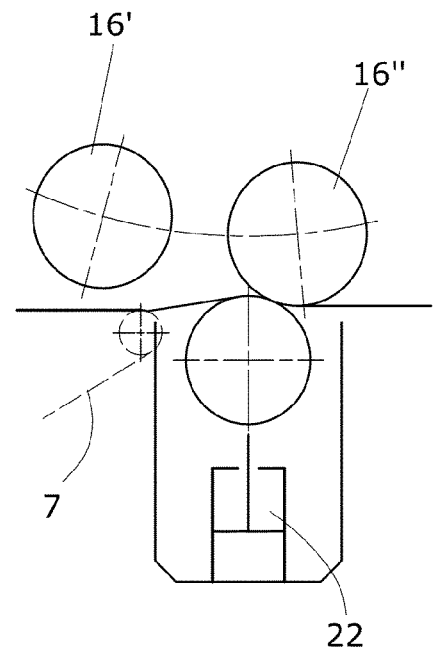
FIG. 11 shows the preparation of the roll change, where the filter belt is initially moved far enough away from the thermal bonding roll gap to create a free space, thereby making it possible to displace the counter roll upward on the filter belt along the path S so that the treatment roll is displaced toward the counter roll.
Figure 12:
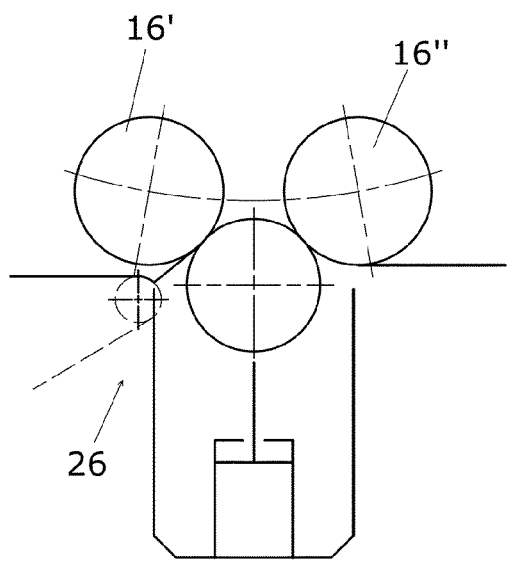
FIG. 12 shows that, during the displacement, the contact of the counter roll with the treatment roll is maintained until the treatment roll also forms a further treatment gap together with the counter roll. The counter roll is thereby displaced upward by way of a displacement device such as a lifting cylinder.
Figure 13:
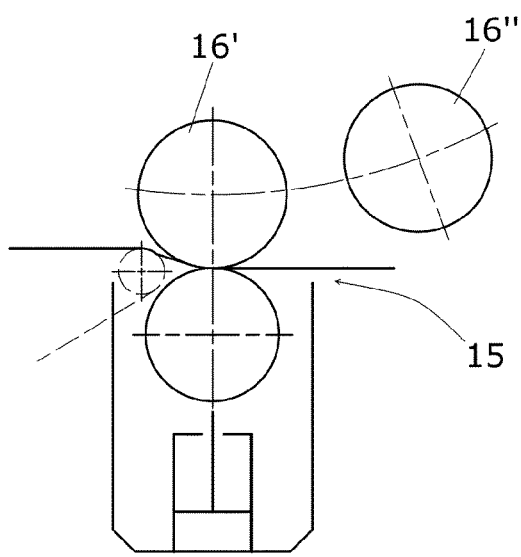
FIG. 13 shows that the treatment rolls being displaced further along the path S until the first treatment roll is located in the working position thereof, in which it forms the thermal bonding roll gap together with the counter roll, the filter belt being displaced back into the starting position.

As explained by FIGS. 10 to 13, the same method can basically also be implemented using a calender 300 that comprises at least a first and a second treatment roll 16', 16" in a magazine (not shown) that is displaceable along a path S. The path S is curved in the shown embodiment. In the operating position shown in FIG. 10, the second treatment roll 16" forms the thermal bonding roll gap 15 together with the counter tool 17 formed as a counter roll 17', in other words it is located in the working position. To prepare the roll change, the filter belt 7 is initially moved far enough away from the thermal bonding roll gap 15 so that a free space is created, which makes it possible to displace the counter roll 17' upward on the filter belt if, as shown in FIG. 11, the treatment rolls 16', 16" are displaced along the path S so that the treatment roll 16' is displaced toward the counter roll. During this displacement, the contact of the counter roll 17' with the treatment roll 16" is maintained until the treatment roll 16' also forms a further treatment gap 26 together with the counter roll 17' (see FIG. 12). For this purpose, the counter roll is displaced upward by way of a displacement device 22, for example, a lifting cylinder. The treatment rolls 16', 16" are subsequently displaced further along the path S until the first treatment roll 16' is located in the working position thereof, in which it forms the thermal bonding roll gap 15 together with the counter roll 17'. The filter belt is displaced back into the starting position thereof (see FIG. 13).

Figure 16:
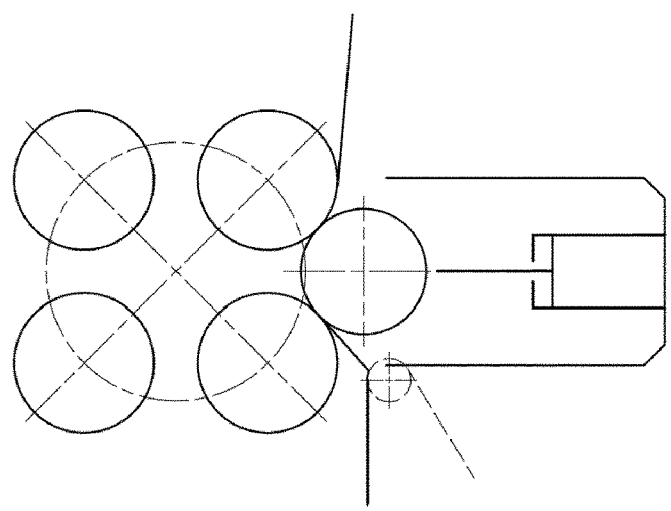
FIG. 16 shows a third relative change in a position of the components of FIG. 15 for the purpose of a roll change.
Figure 15:
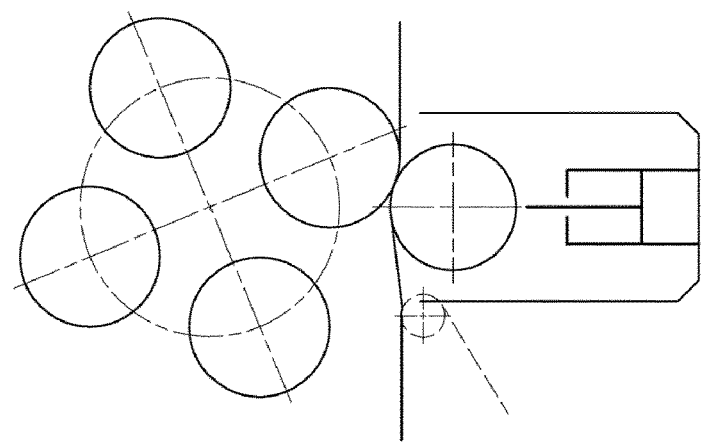
FIG. 15 shows a second relative change in a position of the components of FIG. 15 for the purpose of a roll change.
Figure 14:
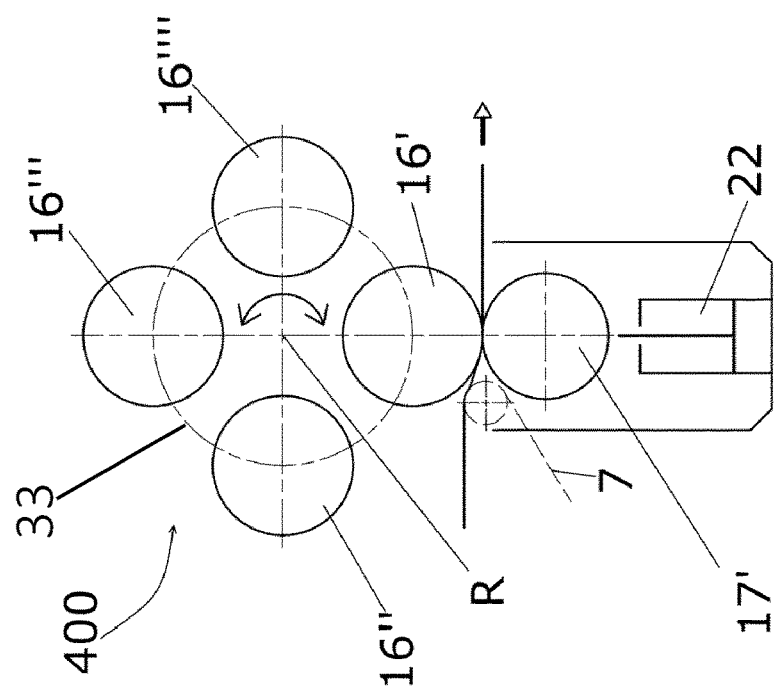
FIG. 14 shows a calender that comprises replaceable treatment rolls in a magazine that is rotatable about an axis of rotation, where a treatment roll change is brought about by rotating the revolver magazine about the revolver axis, the filter belt and the counter roll being displaced in a manner corresponding to the calender.

As is shown by way of FIGS. 14 to 16, the same method can in principle also be carried out using a "revolver calender" 400. A plurality of replaceable treatment rolls 16', 16", 16''', 16'''' are therein arranged in a revolver magazine 33 that is rotatable about a revolver axis R. Instead of the magazine being displaced along the path S as in the calender 300, a treatment roll change can be brought about by rotating the revolver magazine 33 about the revolver axis R, the filter belt 7 and the counter roll 17' being displaced in a manner corresponding to the calender 300.

A further embodiment of the method according to the present invention for the treatment of a product web is now explained via FIGS. 17 to 21.

In this embodiment, as is shown in FIG. 17, the product web W is again provided by a filter belt 7 and guided through a treatment gap 26. Subsequently, the product web W again circulates around two cooling rolls 18, 19.

Unlike in the embodiment of the method according to the present invention shown in FIGS. 4 to 9, an auxiliary roll 31 is provided and, as is shown in FIG. 18, brought into contact with the counter roll 17 while the treatment gap 26 still persists. Between the auxiliary roll 31 and the counter tool 17, a sort of auxiliary treatment gap 32 is thus created. This has properties such as line load, line load distribution and temperature that make it possible to transport the product web W onward in an advance direction V, whether at an unchanged or at a reduced advance speed, if the treatment gap 26 is opened by displacing the first treatment roll 16'.

The operating state after the treatment gap 26 is opened is shown in FIG. 19. Instead of the first treatment roll 16', a second treatment roll 16" can now, as shown in FIG. 20, be displaced into a working position to form a new treatment gap 30. Once this is achieved, the auxiliary roll 31 is moved away, as is shown in FIG. 21.

Only a single treatment roll 16' or more than two treatment rolls 16', 16" may also alternatively be provided, and these may be replaced by a replacement roll in the parked position.

In this embodiment of the method according to the present invention, because of the use of an auxiliary roll 31 to form an auxiliary treatment gap 32, neither the counter tool 17 nor the filter belt 7 must be displaced during a change of the first and second treatment rolls 16', 16".

For carrying out the method shown in FIGS. 17 to 21, not only is the device shown in FIGS. 2 and 3 suitable, in that one of the two treatment rolls 16' or 16" is replaced with an auxiliary roll, but also the devices known per se from DE 10 2014 102 167 A1, DE 10 2014 113 755 A1, DE 10 2015 106 045 A1 or DE 10 2015 107 839 A1.

In the embodiments of the method according to the present invention described above, it is also advantageous that, in the case of a heated counter tool, presently a heated counter roll 17', heat emission at the counter roll is not interrupted. As a result, the temperature difference between the roll interior and roll exterior temperature, which difference is proportional to the heat throughput, does not lead to an increase in the roll exterior temperature during the roll change. The thermally steady state is thus disrupted much less (including at the calender), at least at the counter roll.

The present invention is not limited to embodiments described herein; reference should be had to the appended claims.

LIST OF REFERENCE NUMERALS

100 Device
200, 300, 400 Calender
1 Filaments
2 Spinning beam
3 Deflection roll
4 Deflection roll
5 Deflection roll
6 Deflection roll
7 Filter belt
8 Deposition region
9 Roll
10 Roll
11 Pre-compaction roll pair
12 Pre-compaction roll gap
13 Filament layer
14 Two-layer filament layer
15 Thermal bonding roll gap
16 Treatment roll
16' First treatment roll
16" Second treatment roll
16'" Third treatment roll
16"" Fourth treatment roll
17 Counter tool
17' Counter roll
18 Cooling roll
19 Cooling roll
20 Frame
21 Slide
22 Displacement device
23 First pivot lever
24 Pivot axle
25 Pivot drive
26 Treatment gap
27 Second pivot lever
28 Pivot axle
29 Pivot drive
30 Treatment gap
31 Auxiliary roll
32 Auxiliary treatment gap
33 Revolver magazine
L Airstream
O Upper face
R Revolver axis
S Path
V Advance direction
W Product web

What is claimed is:

1. A method for a treatment of a product web which is transported in an advance direction, the method comprising:
   guiding the product web through a first treatment gap which is formed by a first treatment roll being arranged in a first working position and a counter tool;
   providing a second roll, the second roll being a second treatment roll;
   moving the second roll into a second working position in which the second roll forms a second treatment gap with the counter tool;
   moving the first treatment roll into a first parked position in which the first treatment roll does not form the first treatment gap with the counter tool; and
   guiding the product web through the second treatment gap while the second treatment roll is in the second working position,
   wherein,
   the second working position is always arranged at a distance from the first working position so as to avoid a collision between the first treatment roll and the second treatment roll, or between a mounting of the first treatment roll and a mounting of the second treatment roll, when the first treatment gap and the second treatment gap exist simultaneously,
   the first working position and the second working position overlap when either the first treatment gap or the second treatment gap solely exists, and
   the mounting of the first treatment roll and the mounting of the second treatment roll are independent of each other.

2. The method as recited in claim 1, wherein the product web comprises at least one of a non-woven fabric, a textile, a plastics material, and paper.

3. The method as recited in claim 1, wherein the treatment comprises a thermal treatment of the product web.

4. The method as recited in claim 3, wherein the thermal treatment comprises a thermal solidification of the product web which comprises the non-woven fabric.

5. The method as recited in claim 3, wherein the thermal treatment of the product web comprises:
   depositing filaments of a thermoplastic material on an upper face of a circulating filter belt; and
   transporting the filaments deposited to the treatment gap.

6. The method as recited in claim 1, wherein the counter tool is provided as a counter roll.

7. A method for a treatment of a product web which is transported in an advance direction, the method comprising:
   guiding the product web through a first treatment gap which is formed by a first treatment roll being arranged in a first working position and a counter tool;
   providing a second roll, the second roll being an auxiliary roll;
   moving the second roll into a second working position in which the second roll forms a second treatment gap with the counter tool so that the first treatment gap and the second treatment gap exist simultaneously; and
   moving the first treatment roll into a first parked position in which the first treatment roll does not form the first treatment gap with the counter tool,
   wherein,
   the auxiliary roll allows
      the product web to advance during a time required to bring the first treatment roll into the first parked position and to bring a second treatment roll into a working position so as to form a third treatment gap with the counter tool, and
   the treatment of the product web is continued when performing the method.

8. The method as recited in claim 7, wherein the product web comprises at least one of a non-woven fabric, a textile, a plastics material, and paper.

9. The method as recited in claim 7, wherein the treatment comprises a thermal treatment of the product web.

10. The method as recited in claim 9, wherein the thermal treatment comprises a thermal solidification of the product web which comprises the non-woven fabric.

11. The method as recited in claim 9, wherein the thermal treatment of the product web comprises:
    depositing filaments of a thermoplastic material on an upper face of a circulating filter belt; and
    transporting the filaments deposited to the treatment gap.

12. The method as recited in claim 7, wherein the counter tool is provided as a counter roll.

* * * * *